L. W. BUGBEE.
TORIC LENS SERIES AND PROCESS OF MAKING THE SAME.
APPLICATION FILED DEC. 6, 1920.
1,426,148.                                         Patented Aug. 15, 1922.
                                                        2 SHEETS—SHEET 1.
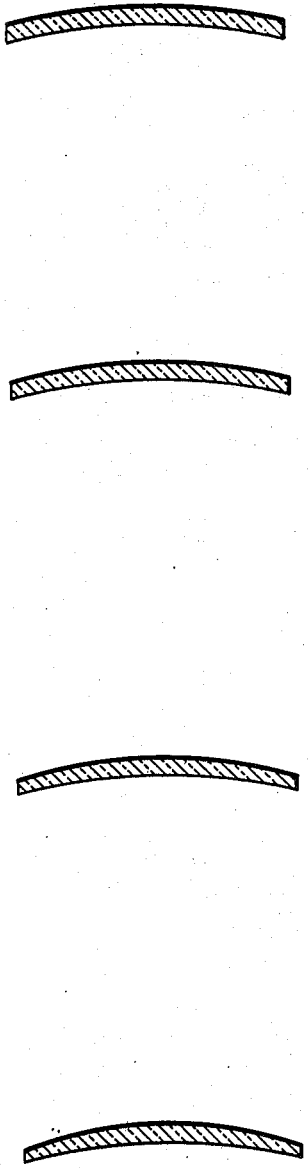
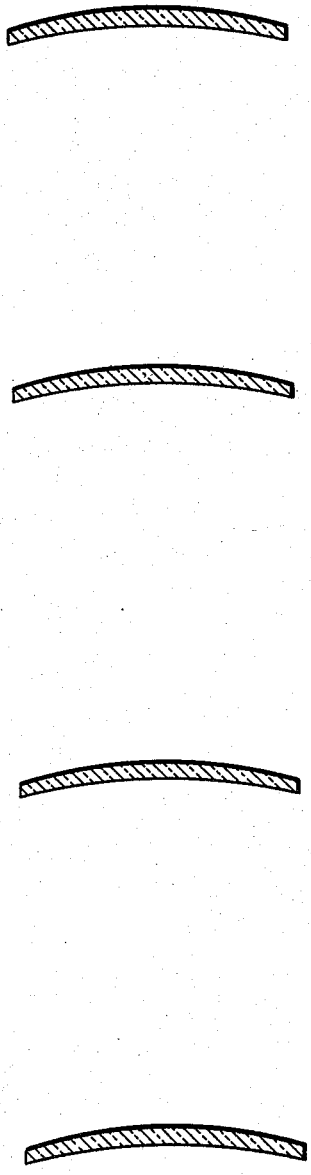
INVENTOR.
LUCIAN W. BUGBEE.
BY
ATTORNEYS L. W. BUGBEE.
TORIC LENS SERIES AND PROCESS OF MAKING THE SAME.
APPLICATION FILED DEC. 6, 1920.
1,426,148.
Patented Aug. 15, 1922.
2 SHEETS—SHEET 2.
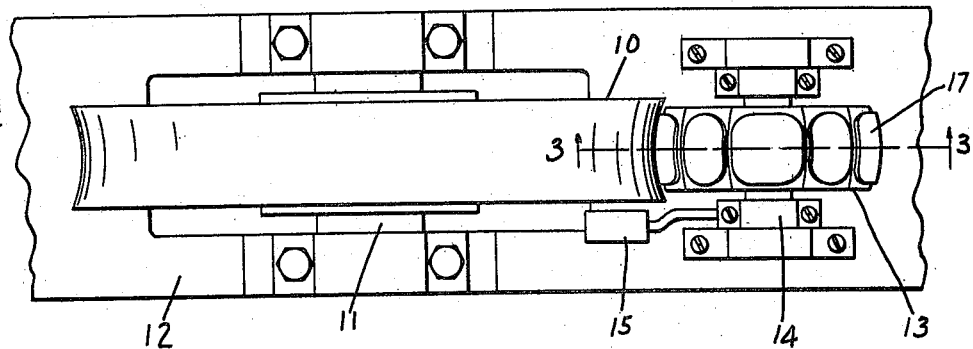
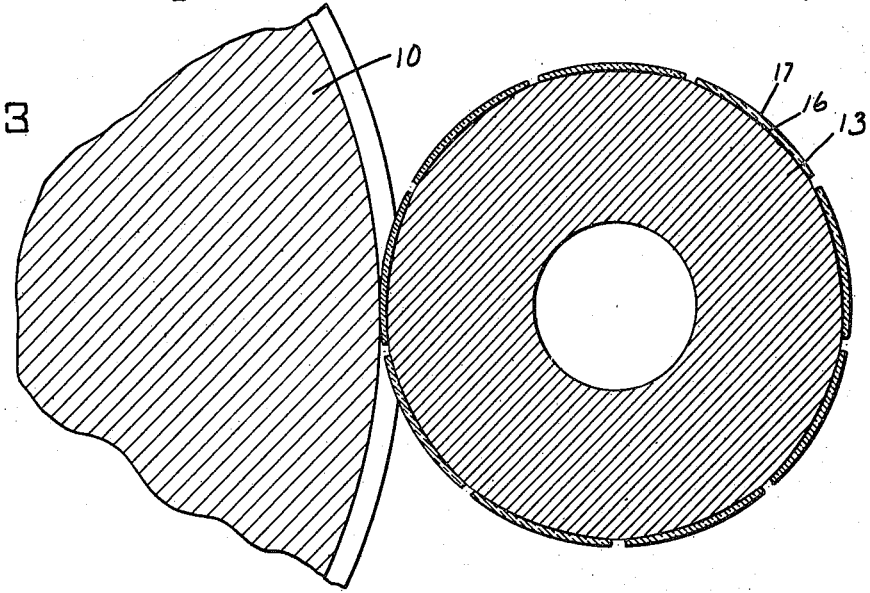
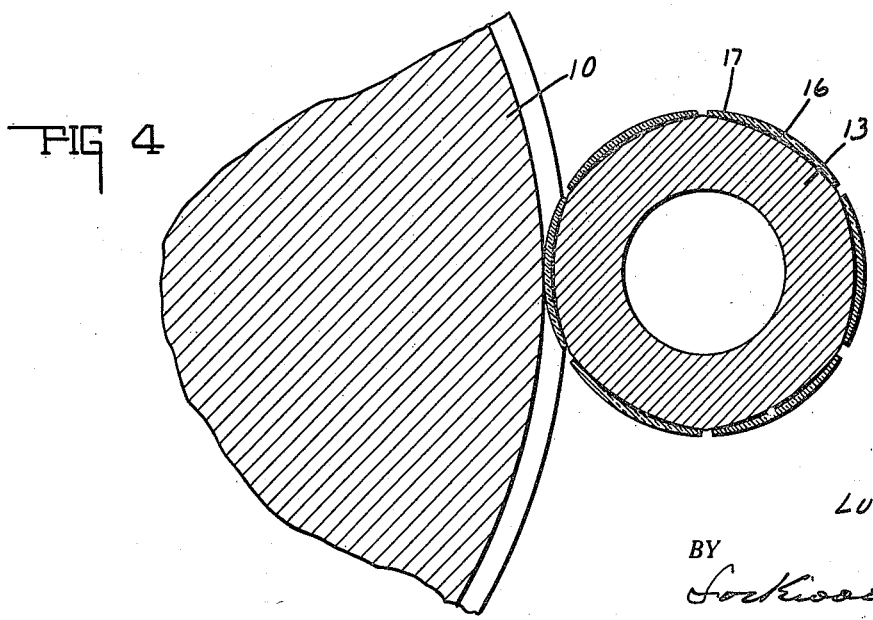
INVENTOR.
LUCIAN W. BUGBEE.
BY
*Lockwood & Lockwood*
ATTORNEYS.

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

TORIC-LENS SERIES AND PROCESS OF MAKING THE SAME.

1,426,148.      Specification of Letters Patent.      Patented Aug. 15, 1922.

Application filed December 6, 1920. Serial No. 428,759.

*To all whom it may concern:*

Be it known that I, LUCIAN W. BUGBEE, a citizen of the United States, and a resident of Indianapolis, county of Marion, and State of Indiana, have invented a certain new and useful Toric-Lens Series and Process of Making the Same; and I do hereby declare that the following is a full, clear, and exact description thereof, reference being had to the accompanying drawings, in which like numerals refer to like parts.

This invention relates to a series of ophthalmic lenses of toric type having a constant thickness in the central portion thereof and a constant base curve on the concave sides, the convex surfaces thereof being toric with a constant meridional curvature and the power of the lenses being substantially the same in the meridional curvature and with varying equatorial curvatures, and the process of making the same.

The invention also includes the specific series of lenses herein illustrated wherein the marginal thickness of the lenses in the meridional curvatures is constant, and the lenses have a constant thickness at the central portion thereof, but the marginal thickness of the lenses in the equatorial curvature varies inversely according to the equatorial curvatures.

The process of making said toric lens series consists first in forming on the concave sides of said lenses a uniform base curvature, say, of six dioptrics and afterwards grinding and finishing the convex surfaces in toric form with the characteristics above mentioned. The invention particularly consists in mounting the lens blanks of the series with said concave sides secured upon the periphery of spotting wheels of varying diameters and grinding the toric surfaces with grinding tools or stones for giving the same a constant meridional curvature, and arranging the spotting wheels with reference to the grinding tools so that the thickness of the lenses at the central portion thereof and in the marginal portions in the meridional curvatures will be constant, wherefore the marginal thickness of the lenses in the equatorial curvatures will vary inversely according to said varying equatorial curvatures.

The full nature of the invention will be understood from the accompanying drawings and the following description and claims:

In the drawings, Fig. 1 illustrates sections through such series of toric lenses made according to the process herein set forth, the upper row showing the equatorial curvatures and the lower row the meridional curvatures of the corresponding lenses.

Fig. 2 is a plan view of apparatus employed in carrying out the process, there being shown a grinder and a spotting wheel and associated parts. Figs. 3 and 4 are vertical sections on the line 3—3 of Fig. 2, through the spotting wheel and adjacent portion of the grinder, the grinders in Figs. 3 and 4 being on the same scale, but the spotting wheel in Fig. 3 being of greater relative diameter than that shown in Fig. 4.

The apparatus will be briefly referred to before stating the steps of the process which constitutes this invention. A grinding wheel 10 is mounted by an arbor 11 on a support 12 so that the grinder is in vertical position and its periphery is transversely concave as shown in Fig. 2, having a curvature adapted to give to the lenses the desired transverse or meridional curvature. The spotting wheels 13 are similarly formed, but are variable in diameter as hereinafter explained. Two sizes are shown in the drawings. The spotting wheels are mounted on the support 12 so as to operate tangentially of the grinding wheel. The arbor of the spotting wheel in use at any given time in making a series is mounted on a frame 14 arranged by a construction not herein fully shown so as to rock towards or away from the grinding wheel and a weighted arm 15 is mounted on said rocking frame so as to yieldingly hold the spotting wheel against the grinding wheel during the operation of the machine. Means not shown is provided for rotating the grinding wheel.

The peripheries of the spotting wheels are provided with seats 16 for receiving the lens blanks 17. These seats on any one spotting wheel are at a uniform distance from the center of that particular spotting wheel, but such distance in different spotting wheels varies according to the diameters of the spotting wheels used, and are of substantially the same curvature and usually are substantially of six diopter curvature so as to receive lens blanks having concave surfaces of six diopters, which is herein referred to as the uniform base curve.

The first step in the process consists in grinding and finishing the concave sides of the series of lens blanks so that they will have the desired base curvature, say, six dioptrics, and said curvature will be the same or constant. Then the blanks are secured accurately and uniformly on a spotting wheel and ground by a rotary grinding element, both of which are rotated, said mechanism being the same as that shown in my pending application Serial No. 426,562, filed November 26, 1920.

The equatorial curvature will be determined by the diameter of the spotting wheel used and the thickness of the lenses or blanks secured thereon, that is, by the distance from the axis of the spotting wheel to the anterior or outer surfaces of the lenses or blanks. An increase in said distance will cause a corresponding decrease in the equatorial curvature.

In carrying out this process a series of spotting wheels of gradually increasing or diminishing diameters are employed, but a single grinding wheel or element, or grinding elements having a constant transverse curvature, should be used. The lenses of the series are ground so that the central portions thereof will have a constant thickness. Since the base curve and meridional curvatures are constant, the marginal thickness of the lenses in each series in the equatorial curvature will vary inversely according to the equatorial curvature, that is, as the equatorial curvatures decrease the marginal thickness of the lenses in the equatorial curvature will increase proportionately.

The foregoing will appear from the drawings in Fig. 7, which shows sections through a series of four lenses, the upper row showing the sections through the equatorial curvatures and the lower row showing sections through the meridional curvatures of corresponding lenses in the upper row. There is shown the base or concave sides of the lenses having a constant curvature, and the meridional curvature shown in the lower row is constant. Also the thickness at the center is constant and the meridional thickness of the lenses of the meridional curvature is constant, as shown in the lower row. The only variation is in the equatorial curvatures gradually decreasing from left to right in the upper row and the marginal thickness of the lenses in the equatorial curvatures gradually increasing from left to right, as there shown.

The foregoing process produces a lens series in which all of the lenses have the same lens power in their meridional curvature within commercial limits or the limit of theoretical perfection. They also have the same base curve, meridional curve, thickness at the center, and thickness in the margins of the meridional curve, and vary only in the equatorial curves and the thickness of the margins of the equatorial curves.

The invention claimed is:

1. A toric lens series having a constant base curve on the concave sides thereof and toric surfaces on the convex sides thereof with a constant meridional curvature and with varying equatorial curvatures, the thickness of said lenses at the central portions and the lens power in the meridional curvature thereof being substantially constant.

2. A toric lens series having a constant base curve on the concave sides thereof and toric surfaces on the convex sides thereof with a constant meridional curvature and the lens power in the meridional curvature being substantially the same and with varying equatorial curvatures, the marginal thickness thereof in the meridional curvature being constant.

3. A toric lens series having a constant base curve on the concave sides thereof and toric surfaces on the convex sides thereof with a constant meridional curvature and the lens power in the meridional curvature being substantially the same and with varying equatorial curvatures, the thickness of said lenses at the central portion thereof and at the margins in the meridional curvature being constant.

4. A toric lens series having a constant base curve on the concave sides thereof and toric surfaces on the convex sides thereof with a constant meridional curvature and the lens power in the meridional curvature being substantially the same and with equatorial curvatures varying inversely according to the marginal thickness of the lenses in the equatorial curvatures.

5. The process of making a toric lens series, which process consists in first grinding the concave sides thereof with a constant curvature, mounting the same on spotting wheels of varying diameters, and applying a grinding element to the exterior surfaces of the lenses for giving them a constant meridional curvature with the spotting wheels arranged with relation to the grinding element so that the thickness of the lenses at the central portions thereof will be constant, whereby the marginal thickness and lens power in the meridional curvature will be substantially constant and the equatorial curvatures and the marginal thickness of the lenses in the equatorial curvatures will vary.

In witness whereof, I have hereunto affixed my signature.

LUCIAN W. BUGBEE.